United States Patent
Claverie et al.

(10) Patent No.: US 6,748,736 B1
(45) Date of Patent: Jun. 15, 2004

(54) DEVICE FOR SELECTIVELY COOLING A MOTOR VEHICLE ENGINE EXHAUST GASES

(75) Inventors: Patrick Claverie, Clamart (FR); Arnaud Vitel, La Garenne-Colombes (FR)

(73) Assignee: Peugeot Citroen Automobiles S.A. (FR)

(*) Notice: Subject to any disclaimer, the term of this patent is extended or adjusted under 35 U.S.C. 154(b) by 0 days.

(21) Appl. No.: 10/130,677
(22) PCT Filed: Nov. 20, 2000
(86) PCT No.: PCT/FR00/03221
§ 371 (c)(1),
(2), (4) Date: Nov. 22, 2002
(87) PCT Pub. No.: WO01/38701
PCT Pub. Date: May 31, 2001

(30) Foreign Application Priority Data

Nov. 22, 1999 (FR) .............................................. 99 14660

(51) Int. Cl.⁷ ................................................. F01N 3/00
(52) U.S. Cl. .......................................... 60/298; 60/320
(58) Field of Search ................... 60/298, 320; 165/159, 165/175, 179

(56) References Cited

U.S. PATENT DOCUMENTS

| | | | |
|---|---|---|---|
| 4,220,200 A | * | 9/1980 | Weber .......................... 165/142 |
| 4,685,292 A | * | 8/1987 | Brigham et al. ............... 60/320 |
| 4,685,430 A | * | 8/1987 | Ap ........................ 123/142.5 R |
| 6,178,744 B1 | * | 1/2001 | Perset .......................... 60/288 |

FOREIGN PATENT DOCUMENTS

| | | |
|---|---|---|
| DE | 3039742 | 5/1982 |
| DE | 29708011 | 8/1998 |
| EP | 0848142 | 6/1998 |
| EP | 0886039 | 12/1998 |

OTHER PUBLICATIONS

PCT Search Report, PCT/FR00/03221, Mar. 3, 2001, p. 1–3.

* cited by examiner

Primary Examiner—Thomas Denion
Assistant Examiner—Diem Tran
(74) Attorney, Agent, or Firm—Connolly, Bove, Lodge & Hutz LLP

(57) ABSTRACT

The invention concerns a cooling device comprising, inside a substantially cylindrical outer casing (2) having a side wall traversed by orifices (3) a first flow path consisting of a tube (16) extending in an axial direction of the cylindrical casing and a second flow path (17) consisting of a plurality of tubes (17a, 17b, 17c) fixed by maintaining means (14a, 14b, 14c, 14d) in substantially parallel arrangements in an axial direction of the cylindrical casing (2), a duct (4) for the intake of exhaust gases, a duct (6) for evacuating exhaust gases and means for dispensing (15a, 15b, 15c, 15d) exhaust gases arranged inside the cylindrical casing (2) to cause the exhaust gases to pass through the first and through the second flow paths. Switching means consisting of a valve controlled (11) for opening and closing one or the other at least of the flow paths (16, 17) enable to cause the gases to pass inside the first flow path (16) with little heat loss or inside the second flow path (1) with high heat loss.

11 Claims, 4 Drawing Sheets

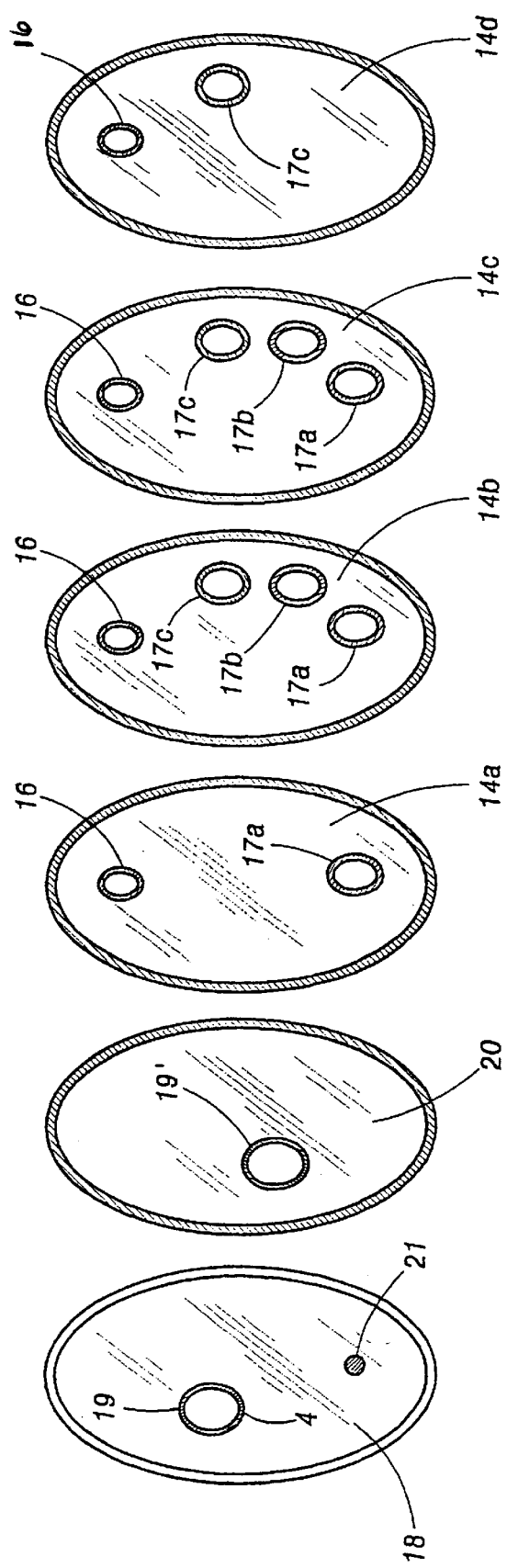

DEVICE FOR SELECTIVELY COOLING A MOTOR VEHICLE ENGINE EXHAUST GASES

FIELD OF THE INVENTION

The invention relates to a device for selectively cooling motor vehicle engine exhaust gases, fitted into the path of the exhaust gases in an exhaust line of the vehicle.

BACKGROUND OF THE INVENTION

The exhaust lines of motor vehicles may comprise gas treatment devices, such as cleaning systems in which there are removed certain pollutants, such as nitrogen oxides (NOx), contained in the exhaust gases coming from the vehicle engine.

Treatment of the exhaust gases in order to remove pollutants consists in bringing the exhaust gases into contact, in a treatment device, with an active element composed of a mixture of different metals chosen for their capacity to catalyze conversion reactions of the pollutants or to adsorb the pollutants. The active element is deposited in the form of an impregnation layer on a porous ceramics support fixed inside a sheet metal casing of the cleaning device. The porous ceramics support is itself covered with a porous aluminum-based layer called the "wash-coat", which is intended to increase considerably the contact surface between the gases and the active elements deposited on the wash-coat. The active element of the cleaning system and the wash-coat are not resistant above a certain temperature of the exhaust gases and, when in contact with exhaust gases at an excessive temperature, undergo irreversible damage, so that they are no longer capable of performing their cleaning function.

For example, in the case of cleaning systems for removing nitrogen oxides from the exhaust gases of direct injection type petrol engines, such cleaning systems generally being called "NOx traps", the limit temperature that can be withstood by the elements of the NOx trap in contact with the exhaust gases is currently of the order of 850° C.

Those two conditions, which define the position of the cleaning elements in the exhaust line, are often incompatible.

It is then necessary, in order to fulfil the two conditions relating to the temperature of the exhaust gases in the cleaning system, which conditions may be incompatible, to provide a device for cooling the exhaust gases that is able to operate selectively under first and second cooling conditions.

In order to solve that problem, there has been proposed (e.g., in EP-03848.142) a cooling device that comprises first and second tubes for passage of the exhaust gases, the outer wall of which tubes is in contact with cooling air, for example atmospheric air, during operation of the vehicle engine. One of the tubes, which is of great length, permits the removal of a maximum amount of energy, while the second tube, which is of very reduced length, permits the removal of only a very small amount of thermal energy. A control valve allows the exhaust gases to be passed either into one tube or into the other, as a function of operating conditions of the engine or of the exhaust line. By adapting the lengths of the two tubes according to the desired operating conditions, it is possible to adjust the temperature of the exhaust gases before they enter the cleaning system, under all operating conditions of the engine.

However, that solution may require the use of very long tubes which cannot easily be accommodated in the vehicle, either in the engine block or in the sub-floor area.

BRIEF DESCRIPTION OF THE INVENTION

The object of the invention is, therefore, to propose a device for cooling motor vehicle engine exhaust gases, fitted into the path of the exhaust gases, in an exhaust line of the vehicle, which device comprises a first gas flow path in at least one first pipe that is in contact by way of its outer wall with cooling air, and a second gas flow path that has a length greater than the length of the first flow path and is constituted by at least one second pipe having an outer wall in contact with cooling air, and means for directing the exhaust gases towards the first or second flow path, which means are controlled as a function of an operating parameter of the exhaust line or of the engine, which cooling device can easily be installed in the exhaust line of the engine, for example in a sub-floor area of the motor vehicle.

Those two conditions, which define the position of the cleaning elements in the exhaust line, are often incompatible.

It is then necessary, in order to fulfil the two conditions relating to the temperature of the exhaust gases in the cleaning system, which conditions may be incompatible, to provide a device for cooling the exhaust gases that is able to operate selectively under first and second cooling conditions.

In order to solve that problem, there has been proposed, for example in EP-0.848.142, a cooling device that comprises first and second tubes for passage of the exhaust gases, the outer wall of which tubes is in contact with cooling air, for example atmospheric air, during operation of the vehicle engine. One of the tubes, which is of great length, permits the removal of a maximum amount of energy, while the second tube, which is of very reduced length, permits the removal of only a very small amount of thermal energy. A control valve allows the exhaust gases to be passed either into one tube or into the other, as a function of operating conditions of the engine or of the exhaust line. By adapting the lengths of the two tubes according to the desired operating conditions, it is possible to adjust the temperature of the exhaust gases before they enter the cleaning system, under all operating conditions of the engine.

However, that solution may require the use of very long tubes which cannot easily be accommodated in the vehicle, either in the engine block or in the sub-floor area.

The object of the invention is, therefore, to propose a device for cooling motor vehicle engine exhaust gases, fitted into the path of the exhaust gases, in an exhaust line of the vehicle, which device comprises a first gas flow path in at least one first pipe that is in contact by way of its outer wall with cooling air, and a second gas flow path that has a length greater than the length of the first flow path and is constituted by at least one second pipe having an outer wall in contact with cooling air, and means for directing the exhaust gases totally towards the first or at least principally towards the second flow path, which means are controlled as a function of a thermal operating parameter of the exhaust line or of the engine, which cooling device can easily be installed in the exhaust line of the engine, for example in a sub-floor area of the motor vehicle.

To that end, the cooling device according to the invention comprises, in an outer casing that is substantially cylindrical in shape and through the lateral wall of which there pass openings, in which casing there are arranged the first path constituted by a tube extending in an axial direction of the cylindrical casing, and the second flow path constituted by a plurality of tubes fixed by holding means in substantially parallel arrangements, in an axial direction of the cylindrical casing, a pipe for the admission of exhaust gases into the cylindrical casing, which pipe is connected to an upstream part of the exhaust line, an exhaust gas evacuation pipe connected to a downstream part of the exhaust line, and exhaust gas distribution means arranged inside the cylindrical casing and connecting the admission pipe with end intake parts of the first and second paths, connecting end outlet parts of the first and second paths with the evacuation pipe, and connecting together intermediate parts of the second path constituted by tubes of the plurality of tubes, the directing means being constituted by at least one control valve for opening and closing an end intake part of at least one of the flow paths.

For the purposes of better understanding of the invention, an embodiment of a cooling device according to the invention will be described by way of example, with reference to the attached FIGS.

BRIEF DESCRIPTION OF THE FIGURES

FIGS. 4A, 4B, 4C, 4D, 4E and 4F are cutaway views according to 4A, 4B, 4C, 4D, 4E and 4F respectively, of FIG. 3.

DETAILED DESCRIPTION OF THE INVENTION

Figure 1:
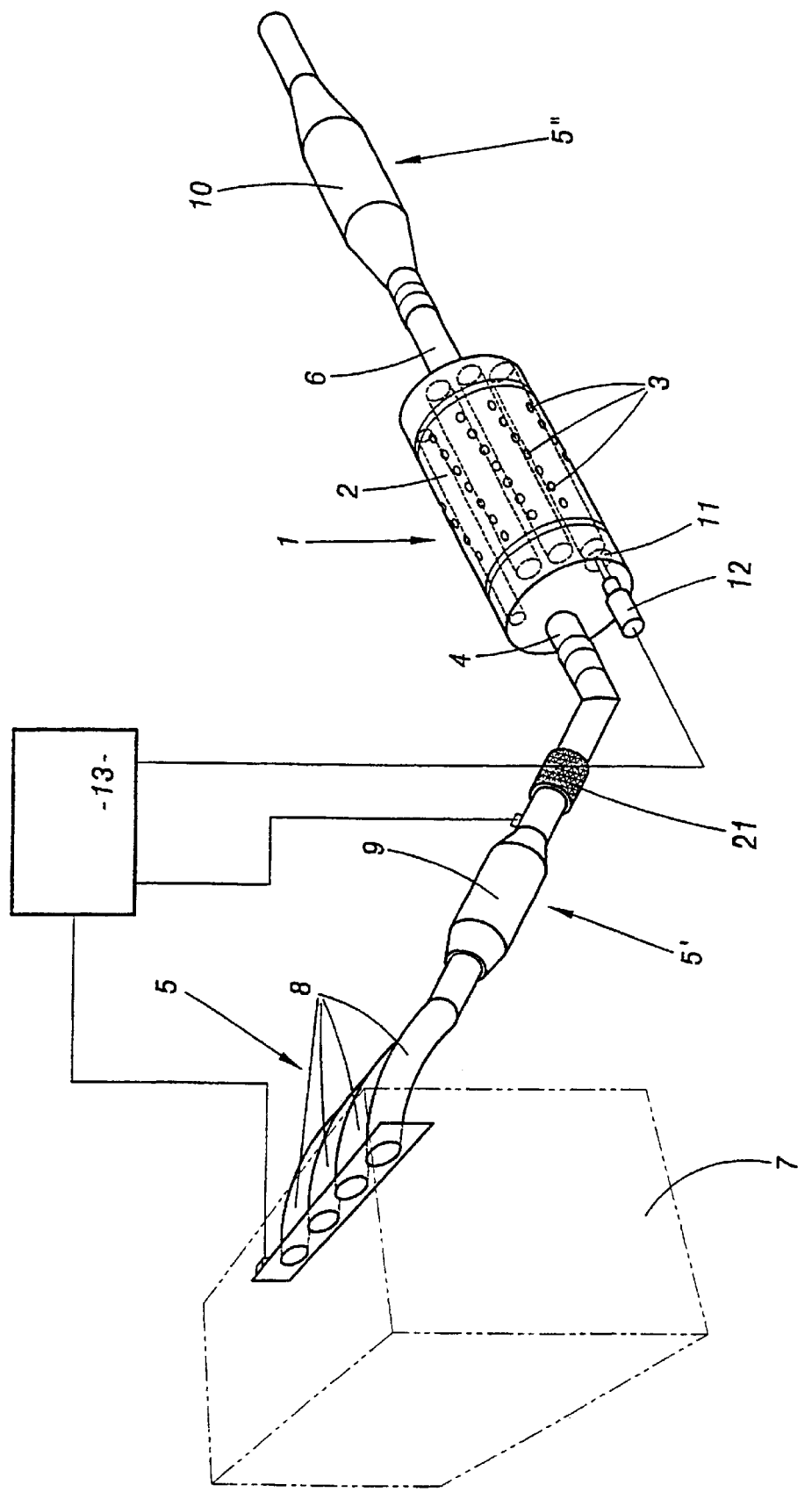
FIG. 1 is a diagrammatic perspective view of part of a motor vehicle exhaust line comprising a selective cooling device according to the invention.

As will be explained below, the cooling device 1 comprises, inside the sheet metal casing 2, two flow paths for the exhaust gases entering the upstream part of the cylindrical casing 2 via the admission pipe 4 and leaving through the downstream part of the cylindrical casing via the evacuation pipe 6. The exhaust gases are directed to one or other of the flow paths inside the cylindrical casing 2 of the cooling device by means of a directing device comprising a valve 11 for opening or closing the end of one of the exhaust gas flow paths, a device 12 for actuating the valve, which device may be an electric motor or a hydraulic or low-pressure pneumatic device, and a control unit 13 for the actuating device 12, which unit receives a measuring signal from a temperature-measuring sensor arranged at the outlet of the first cleaning unit 9 or at the level of the exhaust part of the engine 7.

As will be seen especially in FIGS. 4A to 4F, the metal casing 2 of cylindrical shape has a transverse cross-section perpendicular to the axis of the cylinder that is oblong, for example elliptical, in shape. In some cases, the casing of the device may have a more complex shape in order to allow the device to be accommodated beneath the floor of the motor vehicle.

Figure 2:
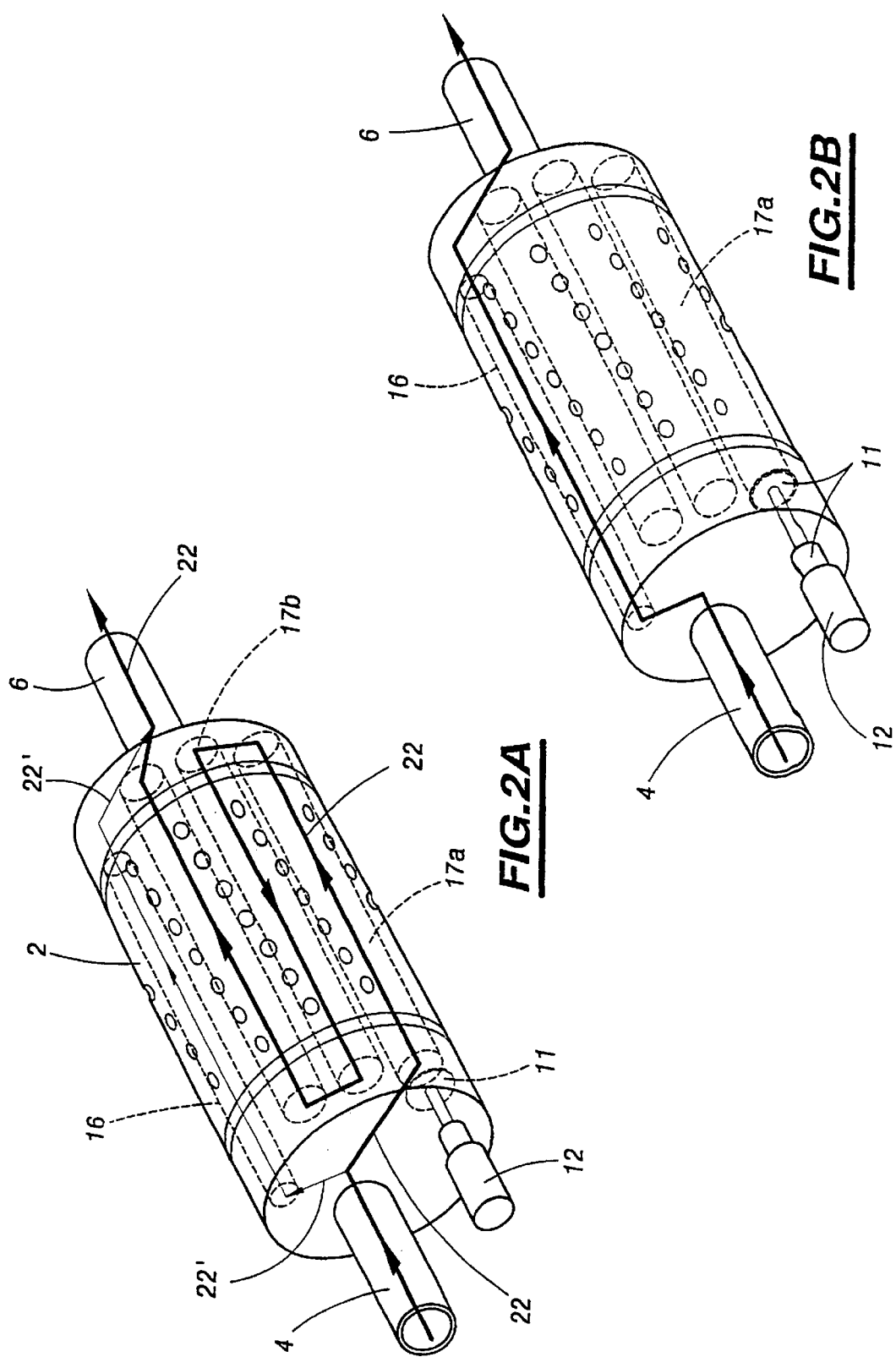
FIGS. 2A and 2B are perspective views of the cooling device according to the invention in an operating phase of high energy loss and in an operating phase of low energy loss, respectively.
Figure 3:
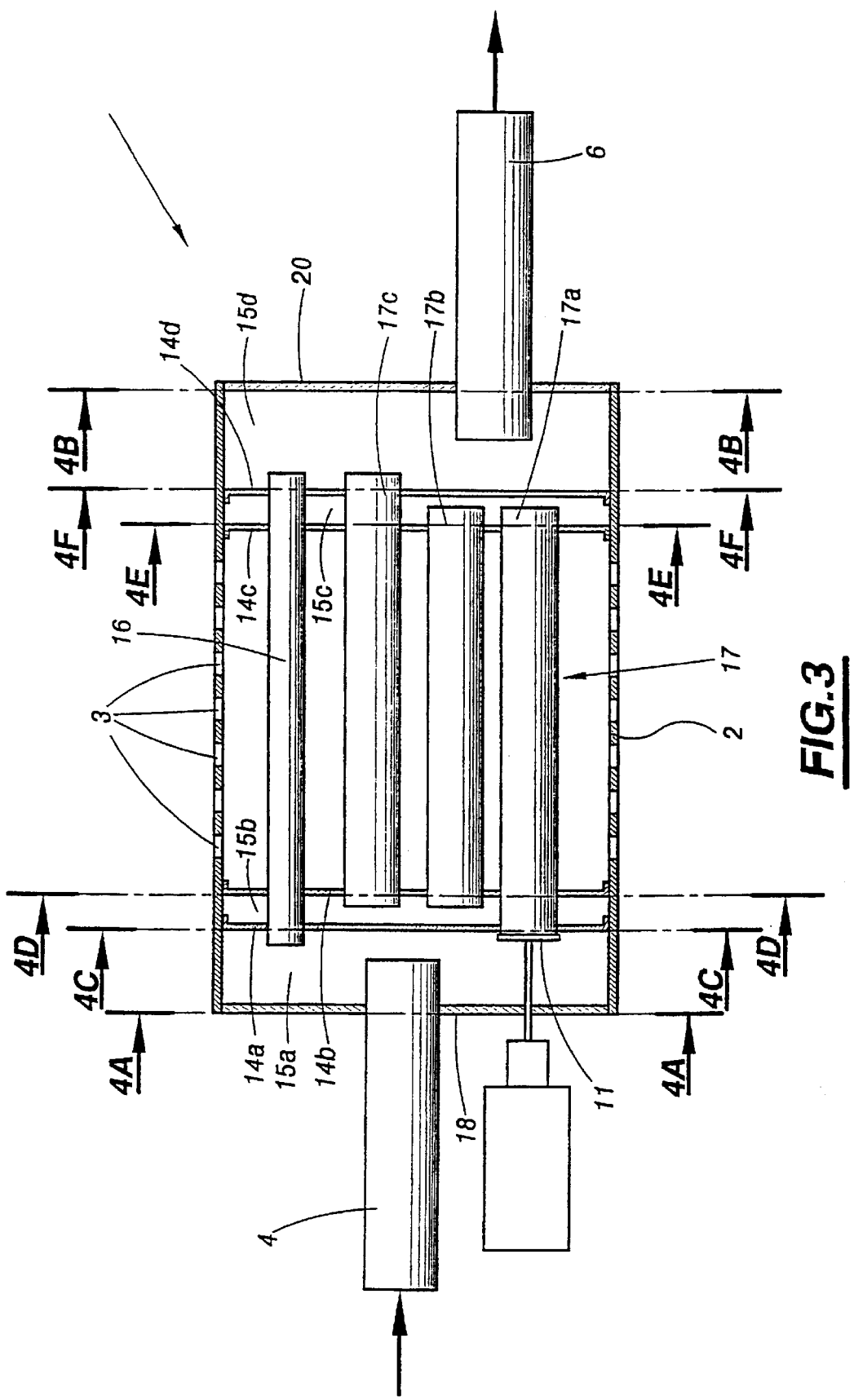
FIG. 3 is a diagrammatic axial cutaway view of the cooling device according to the invention.

As will be seen especially in FIGS. 2A, 2B and 3, inside the casing 2, a first gas flow path is constituted by a single straight tube 16 arranged in the casing in an arrangement substantially parallel to the axis of the cylindrical casing, and the second flow path is constituted by three straight tubes 17a, 17b, 17c which are fixed inside the casing 2 in arrangements substantially parallel to the axis of the cylindrical casing 2.

The exhaust gases circulate in the axial direction inside the tubes 17a, 17b and 17c in succession, when the second gas flow path in the cooling device 1 is activated by opening of the valve 11.

The tubes 16, 17a, 17b and 17c are maintained inside the casing 2 of the cooling device 1 by cupels 14a, 14b, 14c and 14d. As will be seen in FIGS. 4C to 4F, the cupels 14a, 14b, 14c and 14d have the oblong, for example elliptical, shape of the inside transverse cross-section of the metal casing 2 of the cooling device. In some cases, depending on the space available beneath the floor of the vehicle, more complex shapes may be provided for the transverse cross-section of the casing and for the cupels. Each of the cupels, which are made of sheet metal, comprises an edge which is bent through 90° relative to the plane of the cupel and by means of which the cupel is fixed inside the metal casing 2 of the cooling device 1, by crimping and by welding. The cupels 14a, 14b, 14c and 14d will be referred to as inner cupels.

Moreover, the upstream axial end of the metal casing 2 is closed by an upstream outer cupel 18, and the downstream axial end of the casing 2 is closed by a downstream outer cupel 20. The outer cupels 18 and 20, which have a shape analogous to that of the inner cupels and have been shown in FIGS. 4A and 4B, respectively, are fixed to the respective upstream and downstream end edge of the metal casing 2 by crimping along their outer edge.

The first inner cupel 14a and the second inner cupel 14b are fixed inside the metal casing 2 in an upstream zone of the metal casing, that is to say close to its upstream end closed by the upstream outer cupel 18.

The third inner cupel 14c and the fourth inner cupel 14d are fixed inside the metal casing 2 of the cooling device in a downstream end zone, that is to say close to the downstream end of the metal casing closed by the downstream outer cupel 20.

The outer cupels and the inner cupels are fixed to the casing 2 in transverse arrangements, that is to say perpendicular to the axis of the cylindrical casing 2, all the cupels thus being parallel to one another.

The outer cupels 18 and 20 and the inner cupels 14a, 14b, 14c, 14d delimit between them collectors 15a, 15b, 15c and 15d for distribution of the exhaust gases.

The first collector 15a is delimited between the upstream outer cupel 18 and the first innercupel 14a.

The second collector 15b is delimited between the first inner cupel 14a and the second inner cupel 14b.

The third collector 15c is delimited between the third inner cupel 15c and the fourth inner cupel 14d.

Finally, the fourth collector 15d is delimited between the fourth inner cupel 14d and the downstream outer cupel 20 of the cooling device.

As will be seen in FIG. 4A, an opening 19, which may be circular or, optionally, oblong, for example elliptical, passes through the upstream outer cupel 18, in which opening 19 there is engaged and fixed by crimping an end of the exhaust gas admission pipe 4 opening into the first collector 15a. An opening 21 for passage of the rod of the valve flap 11 of the control valve also passes through the upstream outer cupel 18.

Through the second outer cupel, or downstream cupel 20, there passes an opening 19' for the engagement and fixing by crimping of an end of the exhaust gas evacuation pipe 6 opening into the fourth collector 15*d*.

Both the exhaust gas admission tube 4 and the exhaust gas evacuation tube 6 have a transverse cross-section that may be circular or, optionally, oblong, for example elliptical, which adjusts itself perfectly in the opening 19 or 19'.

In general, the tube 16 and the tubes 17*a*, 17*b* and 17*c* constituting the exhaust gas flow paths inside the casing 2 of the cooling device are also circular or, optionally, oblong, for example elliptical, in shape and are crimped in the openings in the cupels.

For fixing of the end portions of the tubes constituting the exhaust gas flow paths of the cooling device, openings for the engagement of the tubes by their end portions pass through the inner cupels 14*a*, 14*b*, 14*c* and 14*d*.

As will be seen in FIGS. 4C to 4F, the four inner cupels 14*a*, 14*b*, 14*c* and 14*d* each comprise an opening for the engagement and fixing of the tube 16 constituting the only pipe for passage of the gases in the first flow path.

The first, second and third inner cupels 14*a*, 14*b* and 14*c* each comprise an opening for the passage and fixing of the first tube 17*a* of the second flow path 17. The second cupel 14*b* and the third cupel 14*c* each comprise an opening for the passage and fixing of the second tube 17*b* of the second flow path 17.

Through each of the second, third and fourth inner cupels 14*b*, 14*c* and 14*d* there passes an opening for the passage and fixing of an end portion of the third tube 17*c* of the second exhaust gas flow path 17.

The openings 3 passing through the lateral wall of the sheet metal casing 2 of the cooling device are all located in a central zone of the lateral wall, between the cupels 14*b* and 14*c*, that is to say between the second collector 15*b* and the third collector 15*c*, the length in the axial direction of the central zone being only slightly less than the total length of the metal casing 2, owing to the fact that the collectors 15*a*, 15*b*, 15*c* and 15*d* have a small axial length.

The upstream and downstream end portions of the lateral wall of the metal casing 2, to which the outer cupels are attached and fixed and in which the inner cupels are fixed, do not have any openings. Furthermore, the crimping or welding of the cupels and the fixing by crimping of the tubes of the flow paths permit totally tight closing of the collectors 15*a*, 15*b*, 15*c* and 15*d*, which communicate only by way of the tubes of the flow paths.

As will be seen in FIG. 3 and FIGS. 4C to 4F, the tube 16 constituting the only pipe of the first flow path has a cross-section that is substantially smaller than the cross-section of the tubes 17*a*, 17*b*, 17*c* of the second exhaust gas flow path 17.

The tube 16 of the first flow path opens at one of its ends into the first collector 15*a* and at its other end into the fourth collector 15*d*.

The first tube 17*a* of the second exhaust gas flow path opens at one of its ends into the first collector 15*a* and at its other end into the third collector 15*c*.

The second tube 17*b* of the second flow path opens at one of its ends into the second collector 15*b* and at its other end into the third collector 15*c*.

The third tube 17*c* of the second flow path opens at one of its ends into the second collector 15*b* and at its other end into the fourth collector 15*d*.

During operation of the exhaust line 5, the temperature of the exhaust gases is measured, preferably at the outlet of the first cleaning unit 9 or in the distribution collector of the engine 7. The measured temperature is compared with a reference value by the electronic processing unit 13.

When the measured temperature is greater than the reference value, for example when the engine is operating at a high load with the emission of exhaust gases at a very high temperature, the actuating device 12 of the valve 11 is operated by the processing unit 13 to open the valve, that is to say, as is shown in FIG. 2A, so that the valve flap integral with the rod passing through the cupel 18 is removed from the intake end of the first tube 17*a* of the second gas flow path.

The exhaust gases, the flow of which is shown by arrows 22, are introduced into the first collector 15*a* via the exhaust gas admission pipe 4.

Owing to the difference in cross-section between the tubes 17*a* and 16, the principal exhaust gas flow 22 enters the first tube 17*a* of the second flow path and flows axially therein. Only a very slight, virtually negligible flow 22' of exhaust gases enters the tube 16 of the first flow path and flows axially in the tube 16, the outlet of which opens into the fourth collector 15*d*.

The principal exhaust gas flow 22 flows in the axial direction of the tube 17*a*, the outlet of which opens into the third collector 15*c*. The third collector 15*c* serves to pass the exhaust gases coming from the first tube 17*a* into the second tube 17*b*, the exhaust gases then flowing in the second tube 17*b*, in the axial direction of the tube, in the opposite direction to the direction of flow in the tube 17*a*, that is to say from downstream to upstream in the cooling device. The exhaust gases leave the second tube 17*b* via its upstream end, in the second collector 15*b*, which serves to distribute the exhaust gases coming from the second tube 17*b* into the third tube 17*c* of the second flow path 17. The gases flow in the third tube 17*c* in the axial direction and in the direction from upstream to downstream, and flow at the downstream end of the third tube 17*c* into the fourth collector 15*d*. The exhaust gases of the principal flow 22 and of the secondary flow 22' are evacuated via the evacuation pipe 6 in the direction of the downstream part of the exhaust line and of the NOx trap 10.

The exhaust gases which have flowed principally in the second flow path, inside the tubes 17*a*, 17*b*, 17*c*, the outer wall of which is cooled by air passing through the openings 3 and circulating by convection in contact with the tubes in the metal casing 2, undergo intense cooling owing to the considerable length of the path of the gases in the second flow path. That length is slightly less than three times the length of the sheet metal casing 2 of the cooling device, so that the thermal power removed by the cooling air circulating in contact with the tubes may be high, for example of the order of 15 kW, in the case of an engine whose characteristics have been given above.

In the case where the temperature measured by the engine exhaust gas temperature sensor is lower than the reference value, the processing unit 13 transmits a closing command to the actuating device 12 of the valve 11, so that the actuating device 12 positions the valve flap of the valve 11 in a position in which the intake end of the first pipe 17*a* of the second flow path is closed off, as is shown in FIG. 2B. In that case, the exhaust gases entering the first distribution collector 15*a* are only able to flow in the tube 16 constituting the only pipe of the first flow path. The exhaust gases flow inside the tube 16, in its axial direction, and, at the downstream outlet end of the tube 16, enter the fourth distribution collector 15*d*. The exhaust gases are then evacuated via the evacuation pipe 6 towards the downstream part 5" of the exhaust line comprising the NOx trap 10. During their path of small length inside the tube 16, the length of the tube 16 being slightly less than the length of the casing 2, the exhaust gases are cooled only slightly by the cooling air circulating in contact with the outer surface of the tube 16.

In order to reduce the cooling effect on the tube 16 still further, it is possible to provide a layer of thermal insulation on its outer surface.

The cooling device according to the invention can therefore be actuated automatically in order to effect either intense cooling of the exhaust gases with removal of a large amount of thermal power, or slight cooling with removal of a small amount of thermal power.

The cooling device according to the invention therefore allows the NOx trap to be operated under very good conditions, whatever the operating conditions of the engine.

The advantages obtained by using the selective cooling device according to the invention are as follows:

- with regard to the treatment of gases in the exhaust line, the device according to the invention makes it possible to remain within the range of effectiveness of the cleaning system upstream of which the cooling device is located, and to protect the components of the cleaning system from damage of thermal origin;
- with regard to the installation of the device, the device is compact and can easily be installed in a sub-floor area of the motor vehicle;
- with regard to the ease and reliability of production of the device, the technology employed is conventional in the series manufacture of a component for an exhaust line. In particular, the use of tubes and cupels and their assembly by a process such as crimping are wholly mastered and proven techniques for the production of exhaust line components having good mechanical resistance and, especially, good resistance to internal and external corrosion.

The various elements of the cooling device according to the invention, namely the tubes, the cupels and the sheet metal casing, can be produced from any material that can easily be shaped and assembled and that has good resistance to corrosion at high temperatures by the exhaust gases and the cooling air. Such materials may be, for example, aluminised steel, stainless steel, or a chrome-containing nickel alloy.

The invention is strictly not limited to the embodiment that has been described.

Accordingly, the second exhaust gas flow path inside the cooling device may be produced starting from any number of tubes arranged in parallel inside the cylindrical sheet metal casing. The only limitation to the number of tubes permitting an increase in the length of the exhaust gas path is imposed by the maximum number of tubes that can be fixed inside the casing, the cross-section of which is limited in order that the cooling device may be accommodated beneath the floor of the motor vehicle. The tubes constituting the exhaust gas path must have a minimum cross-section and must be spaced out in the cross-section of the metal casing so as to permit the circulation of the air entering the sheet metal casing through the openings in its lateral wall and circulating by convection inside the metal casing in contact with the tubes. The cooling capacity of the device can be increased by increasing the number and diameter of the holes in the casing, which has the effect of intensifying the circulation by convection of the air around the tubes.

In the case of a cooling device having a second gas flow path constituted by n tubes, n will preferably be chosen to be odd in order to ensure that the gases enter and leave on the upstream side and the downstream side, respectively, of the cooling device, without an additional gas return element. In that case, the distribution of the gases inside the metal casing of the cooling device can be effected by forming n+1 collectors inside the metal casing, the collectors being delimited by two outer end cupels of the metal casing and by n+1 inner cupels.

In general, the first flow path is constituted by a single pipe formed by a straight tube, which may be covered with an outer layer of thermal insulation.

In order to pass the exhaust gases from one tube to the next in the direction of flow of the gases, it is possible to use collectors having different forms from those which have been described, those collectors being delimited by different cupel walls. As indicated above, the use of cupels makes it possible to remain within the scope of the conventional manufacture of an element for a motor vehicle exhaust line. It is also possible to provide additional cupels, for example in order to improve the mechanical strength of the device; in particular, additional cupels may be used to provide for better maintenance of the intake and outlet pipes. It may also be of use to add one or more bellows to one or more tubes, in order to compensate for the differential thermal expansion of the tubes, which improves the strength of the device. It would optionally be possible to use curved collectors or deflectors joining the ends of the tubes inside the casing, or any other form of collector or of exhaust gas diverting device.

The outer casing of the device can be produced by stamping, especially by forming two half-shells by stamping and subsequently assembling them.

The device for directing the gases into one flow path or the other, as a function of a thermal parameter such as the temperature of the exhaust gases upstream of the cooling device, may have a form different from that described. Where a valve operated by an electric motor or by a pneumatic or hydraulic device is used, the flap of the valve may be provided to close at least any part of a flow path. The directing device may also be constituted by one or more flaps arranged in one or more collectors of the cooling device, allowing the exhaust gases to be directed towards one flow path or the other.

The cooling device according to the invention is preferably arranged immediately upstream of an exhaust gas treatment device, such as a cleaning system.

Of course, the invention is not limited to the cooling of gases upstream of a NOx trap but may be used upstream of any cleaning device whose components may have to be protected from thermal shocks or from a high temperature or whose operating conditions may have to be controlled in a precise exhaust gas temperature range.

The invention is applicable to any type of motor vehicle comprising an exhaust gas treatment device, such as a cleaning system.

What is claimed is:

1. Device for cooling exhaust gases of the engine of a motor vehicle, fitted into the path of the exhaust gases in an exhaust line of the vehicle, comprising a first gas flow path in at least one first pipe that is in contact by way of its outer wall with cooling air, and a second gas flow path, having a length greater than the length of the first flow path, constituted by at least one second pipe having an outer wall in contact with cooling air, and means for directing the exhaust gases totally towards the first or at least principally towards the second flow path, which means are controlled as a function of a thermal operating parameter of the exhaust line of the engine, wherein the device includes, in an outer casing that is substantially cylindrical in shape and through the lateral wall of which there pass openings in which casing there are arranged the first path constituted by a tube extending in an axial direction of the cylindrical casing, and the second flow path constituted by a plurality of tubes fixed by holding means in substantially parallel arrangements, in an axial direction of the cylindrical casing, a pipe for the admission of exhaust gases into the cylindrical casing, which pipe is connected to an upstream part of the exhaust line, an exhaust gas evacuation pipe connected to a downstream part of the exhaust line, and exhaust gas distribution pipe means arranged inside the cylindrical casing and connecting the admission pipe with end intake parts of the first and second paths, connecting end outlet parts of the first and second paths with the evacuation pipe, and connecting together intermediate parts of the second path constituted by tubes of the plurality of tubes, the directing means being constituted by at least one valve operated to open and close an end intake part of at least one of the flow paths.

2. Cooling device according to claim 1, wherein the exhaust gas distribution means are constituted by collectors delimited, inside the metal casing of the cooling device, by two axial-end cupels or outer cupels that are arranged transversely and close the axial ends of the metal casing of the cooling device, and by a plurality of inner cupels that are each arranged according to the entire inner transverse cross-section of the metal casing, in axial end zones of the metal casing of the cooling device, and through each of which there passes at least one opening for the passage and fixing of a tube of the first and second gas flow paths, each of the tubes of the first and second exhaust gas flow paths being fixed at one of its ends in a first inner cupel and at its other end in a second inner cupel, each of the collectors being delimited inside the lateral wall of the metal casing by a first cupel, which may be an outer cupel or an inner cupel, and by a second cupel, which is an inner cupel, and the admission pipe and the evacuation pipe of the exhaust gases opening through a respective outer cupel.

3. Cooling device according to claim 2, wherein the tubes of the second exhaust gas flow path comprise three tubes and in that the device comprises four collectors delimited inside the metal casing, a first collector being delimited between an outer cupel, through which there passes the exhaust gas admission pipe opening into the first collector, and by a first inner cupel, a second collector being delimited between a first inner cupel and a second inner cupel arranged in a first end zone of the metal casing on the side of the exhaust gas admission pipe, a third collector delimited between a third inner cupel and a fourth inner cupel, in a second end zone of the metal casing on the side of the exhaust gas evacuation pipe, and a fourth collector delimited by the fourth inner cupel and the second outer cupel through which there passes the exhaust gas evacuation pipe, a first tube of the second flow path passing at one of its ends through the first cupel and the second cupel and at its other end through the third inner cupel, so as to open at one of its ends into the first collector and at its other end into the third collector, a second tube of the second flow path passing at one of its axial ends through the second inner cupel and at its other axial end through the third inner cupel, so as to open at its first end into the second collector and at its second end into the third collector, the third tube of the second exhaust gas flow path passing at one of its ends through the second inner cupel and at its other axial end through the third inner cupel and the fourth inner cupel, so as to open at one of its axial ends into the second collector and at its other axial end into the fourth collector, the tube constituting the first exhaust gas flow path passing at one of its axial ends through the first inner cupel and the second inner cupel and at its other axial end through the third inner cupel and the fourth inner cupel, so as to open by means of a first axial end into the first collector and by means of a second axial end into the fourth collector.

4. Cooling device according to claim 3, wherein the openings in the lateral wall of the metal casing of the heat exchanger are located between the second and third inner cupels, the first and second end zones of the metal casing of the heat exchanger having no openings.

5. Cooling device according to claim 2, wherein the tubes of the second exhaust gas flow path comprise n tubes, n being odd, and n+1 collectors delimited by two axial-end cupels of the metal casing and n+1 inner cupels.

6. Cooling device according to any one of claims 2–5, wherein the transverse cross-section of the metal casing, the outer cupels and the inner cupels made of plane sheet metal have an oblong, for example elliptical or more complex, shape in order to allow the device to be accommodated beneath the floor of the motor vehicle.

7. Cooling device according to claim 6, wherein the exhaust gas admission pipe and the exhaust gas evacuation pipe and the tubes of the second exhaust gas flow path have a circular or oblong, for example elliptical, transverse cross-section, the openings passing through the outer cupels and the inner cupels having an analogous shape for the virtually play-free engagement of the pipes and of the tubes in the openings.

8. Cooling device according to claim 1, wherein the tube constituting the first exhaust gas flow path in the cooling device has an inner cross-section that is substantially smaller than the inner cross-section of the tubes of the second flow path, and in that the control valve for opening and closing at least one of the flow paths comprises a flap for opening and closing an end of a first tube of the second flow path that is to receive the exhaust gases entering the metal casing of the cooling device, by way of the admission pipe and a distribution means likewise effecting the distribution of the exhaust gases in the pipe of the first flow path.

9. Cooling device according to any one of claims 1 to 5, wherein it is arranged in the exhaust line of the motor vehicle, upstream of a cleaning system, such as a NOx trap.

10. Device according to claim 1, wherein the outer casing of cylindrical shape is formed by stamping out and assembling two half-shells.

11. Cooling device according to claim 1, at least one bellows is added to at least one of the tubes in order to compensate for the differential thermal expansions of the tubes.

* * * * *